United States Patent
Roberts et al.

(10) Patent No.: US 8,478,860 B2
(45) Date of Patent: Jul. 2, 2013

(54) DEVICE DETECTION SYSTEM FOR MONITORING USE OF REMOVABLE MEDIA IN NETWORKED COMPUTERS

(75) Inventors: Rodeny B. Roberts, Palisade, CO (US); Ronald B. Gardner, Keota, OK (US)

(73) Assignee: Strong Bear L.L.C., Palisade, CO (US)

( * ) Notice: Subject to any disclaimer, the term of this patent is extended or adjusted under 35 U.S.C. 154(b) by 783 days.

(21) Appl. No.: 11/686,055

(22) Filed: Mar. 14, 2007

(65) Prior Publication Data

US 2007/0233842 A1    Oct. 4, 2007

Related U.S. Application Data

(60) Provisional application No. 60/782,333, filed on Mar. 14, 2006.

(51) Int. Cl.
*G06F 15/16* (2006.01)
*G06F 15/00* (2006.01)
*G06F 11/30* (2006.01)

(52) U.S. Cl.
USPC ............ 709/224; 709/217; 709/202; 702/186

(58) Field of Classification Search
USPC .................................................. 709/223, 224
See application file for complete search history.

(56) References Cited

U.S. PATENT DOCUMENTS

| | | | | |
|---|---|---|---|---|
| 5,657,433 A | * | 8/1997 | Murase et al. | 345/642 |
| 5,692,128 A | * | 11/1997 | Bolles et al. | 709/224 |
| 6,148,335 A | * | 11/2000 | Haggard et al. | 709/224 |
| 6,226,689 B1 | * | 5/2001 | Shah et al. | 719/314 |
| 6,408,391 B1 | | 6/2002 | Huff et al. | |
| 6,489,738 B1 | * | 12/2002 | Bates et al. | 318/434 |
| 7,085,936 B1 | | 8/2006 | Moran | |
| 7,120,735 B1 | * | 10/2006 | Summers et al. | 711/111 |
| 7,127,743 B1 | | 10/2006 | Khanolkar et al. | |
| 7,146,644 B2 | | 12/2006 | Redlich et al. | |
| 7,243,226 B2 | | 7/2007 | Newcombe et al. | |
| 2002/0036660 A1 | * | 3/2002 | Adan et al. | 345/802 |
| 2002/0152305 A1 | * | 10/2002 | Jackson et al. | 709/224 |
| 2003/0195957 A1 | * | 10/2003 | Banginwar | 709/223 |

(Continued)

OTHER PUBLICATIONS

Product News Network: Host Intrusion Prevention Solution can control USB devices; Sep. 9, 2005, Web site: http://www.mcafee.com; retrieved from Internet Jul. 26, 2007.

(Continued)

*Primary Examiner* — Asad Nawaz
*Assistant Examiner* — Jason Harley
(74) *Attorney, Agent, or Firm* — Marsh Fischmann & Breyfogle, LLP; Kent A. Lembke

(57) ABSTRACT

A device detection system for detecting use of removable media such as flash drives, portable storage, disks, and digital cameras in computers. From each monitored client, messages are sent by a client device detection application to a server application running on a central or administrator computer or node. The messages include relevant information for the client computer such as IP address, computer name, and user name along with the device. Generally, a message will be sent when the device is first detected such as when it is attached to the client computer or connected to a port and when the device is later changed such as when the device is removed, and detection is achieved by a function intercepting event messages in the operating system environment combined with a drive detector. The messages are stored in system memory so as to log the attachment or use of removable media.

22 Claims, 5 Drawing Sheets

U.S. PATENT DOCUMENTS

| | | | |
|---|---|---|---|
| 2004/0133721 A1* | 7/2004 | Ellerbrock | 710/104 |
| 2005/0091369 A1* | 4/2005 | Jones | 709/224 |
| 2005/0183143 A1* | 8/2005 | Anderholm et al. | 726/22 |
| 2006/0224902 A1 | 10/2006 | Bolt | |
| 2006/0242684 A1 | 10/2006 | Russell et al. | |
| 2007/0174909 A1 | 7/2007 | Burchett et al. | |

OTHER PUBLICATIONS

"Businesses face growing security threat from removable media devices" May 2004, Reflex Magnetics News, http://www.reflex-magnetics.com; retrieved from Internet on Jul. 26, 2007.

* cited by examiner

DEVICE DETECTION SYSTEM FOR MONITORING USE OF REMOVABLE MEDIA IN NETWORKED COMPUTERS

CROSS-REFERENCE TO RELATED APPLICATIONS

This application claims the benefit of U.S. Provisional Application No. 60/782,333 filed Mar. 14, 2006, which is incorporated herein by reference in its entirety.

BACKGROUND OF THE INVENTION

1. Field of the Invention

The present invention relates, in general, to network security including remotely monitoring the use of client and other computers in a computer network or a system of networked computing devices, and, more particularly, to software, hardware, and computer systems for determining the addition and removal of devices such as removable storage or media and the like from client computers and, more specifically, to the unauthorized use of devices such as removable media attached to a client computer or node connected to a secure computer system.

2. Relevant Background

A significant security risk for many organizations and enterprises is the unauthorized copying of secret or proprietary information. For example, many companies closely guard technical specifications for their products, recipes for making their products, plans for business expansion, and other information. Similarly, nearly all organizations need to prevent or limit access to human resources information including employee lists and information including birth dates and identifying data such as social security numbers. Security risks increase as proprietary and other information is stored in memory of a computer system, and this memory is made available over a communications network, such as a local area network (LAN), a wide area network (WAN), the Internet, or other digital communications network. Firewalls and other mechanisms are implemented to limit the risk of unauthorized users accessing the computer system via a public network, e.g., to block unauthorized users from breaching security or hacking into the organization's memory to access sensitive information. Similar mechanisms may also be used to limit or at least monitor data transfer over public communication networks such as the Internet by employees or authorized users of a computer network.

Unfortunately, one of the greatest vulnerabilities to data theft or loss is the copying of data from within the organization or by using one of the organization's networked devices or client computers. Removable media such as removable or portable data storage can be used to remove large amounts of information, and with recent advances in memory technology, the removable media can be quite small and easily concealed, e.g., a Universal Serial Bus (USB) memory device such as a flash drive, key, ZIP disk, can easily store many megabytes of data while being small enough to fit in the palm of a person's hand. In a typical computer system, numerous client computers or computing devices are linked together via a communications network, and many of the client computers are configured with drives and ports to allow media or devices to be attached or inserted. For example, a typical workstation computer may take the form of a personal computer (PC), a desktop computer, a laptop computer, a notebook computer, or other computing or electronic device, and each of these may be configured with one or more floppy disk drives, DVD and CD-ROM drives, removable hard drives or substitute drives, USB ports, serial and parallel ports, and plug-and-play devices such as Bluetooth devices, PDA devices, digital cameras, and the like.

As a result, many organizations have instituted policies that prohibit the use of removable devices with particular client computers or that at least limit such use to a set of acceptable devices that may be used only by authorized users. However, in large and often dispersed computer systems, it is very hard to enforce removable device policies and even harder to identify offenders of such policies.

Hence, there remains a need for improved methods and systems for identifying the attachment or use of removable media or devices to a client computer and reporting the identified use along with an identification of the user to a system administrator or information technology (IT) manager.

SUMMARY OF THE INVENTION

To address the above and other problems with enforcing removable device policies, methods and systems are provided for informing IT managers and other system administrators when users of client computers or nodes in a network are attaching removable media devices. A device detection system (DDS) of embodiments of the invention generally include client and server software that functions to detect removable media, e.g., USB flash drives, CD/DVDs, floppy disks, digital cameras, PDAs, and the like, that are attached to networked client computers. From each monitored client, messages are sent to a central or administrator computer or node, and the messages include relevant information for the client computer such as IP address, computer name, and user name along with the device. Generally, a message will be sent when the device is first detected such as when it is attached to the client computer or connected to a port and when the device is later changed such as when the device is removed. The DDS embodiments of the invention act to store these messages in system memory so as to log the attachment or use of removable media and to allow an operator of the administrator computer or node, i.e., an IT administrator or network security manager or the like, to take appropriate actions to maintain desired network security.

More particularly, a system is provided for monitoring the use of removable devices in a computer network. The system includes a device detection server application running on a first computer that is linked to a communications network such as the Internet or a private digital network. A second computer is also linked to the communications network and is adapted for media such as USB flash drives, floppy disks, CD/DVDs, digital cameras, PDAs, and the like to be attached and removed such as from drives or from ports. A device detection client application is run or executed on the second computer to detect presence of the removable media on the second computer, and, in response of such detection, to transmit a message to the device detection server application over the communications network. The device detection client application detects the media by using both a message interceptor (e.g., a sub-classed function such as a sub-classed winproc function in a Microsoft Windows operating system environment) to intercept messages in the second computer related to media changes or events and also a drive detector that loops through all or a set of drives (e.g., a set defined by the device detection server application) to detect existing drives in the second computer. The message interceptor is effective to detect nearly instantaneously changes in the media based on the intercepted messages and the client application may transmit the message regarding the media to the server application substantially immediately after such detection. In contrast, the drive detector is typically only run periodically, such as after expiration of a monitoring frequency time period or refresh period, but it is useful for detecting drives and, therefore, devices that may be missed by the message interceptor such as devices that were attached while the second computer was turned off. To detect media changes such as attachment or removal of a removable device, the intercepted messages may be processed to see if they contain a parameter that indicates they are within a predefined set of changes to be monitored by the client application, and this set of changes is typically defined by the server application (e.g., by a user of a GUI generated by the server application selecting media changes to monitor). Similarly, the drive detector may only look for the existing drives from among a set of drives or drive types set by the server application (e.g., floppy drives, USB drives, CD drives, and the like that may be used to copy digital data onto removable media). The changes and drives to monitor are generally set for an entire network but may be set for each computer in the network.

DETAILED DESCRIPTION OF THE PREFERRED EMBODIMENTS

The present invention is directed to methods and systems for enhancing network security by facilitating detection of attachment or use of removable devices or media at remote or client computers or devices that are linked to a communications network. Specifically, a device detection system, and corresponding methods, is provided that generally has a DDS server application and a number of DDS client applications, which are provided as software applications or programs running on a computer that acts as a server and on a number of client computers, respectively. Each of the DDS client applications functions to identify the attachment or removal of a device and sends a message corresponding to the device attachment or removal to the DDS server application. The DDS server application processes the messages, stores the messages in a log or logs each event, determines if the device use is authorized, and if not or when appropriate, activates a warning for one or more IT managers (e.g., generates a visual or audio warning at the server computer or at remote devices, causes an e-mail message or phone message to be sent, or otherwise notifies one or more administrators or managers).

To practice the invention, the computer, network, and data storage devices and systems may be any devices useful for providing the described functions, including well-known data processing and storage and communication devices and systems such as computer devices or nodes typically used in computer systems or networks with processing, memory, and input/output components, and server devices configured to generate and transmit digital data over a communications network. Data typically is communicated wired or wirelessly in digital format following standard communication and transfer protocols such as TCP/IP protocols. Data flow between the DDS server application and the DDS clients may be plain text but, in some embodiments, may be encrypted. The use of the terms "removable media" and "removable device" are intended to include any device that can be attached to a computer or other electronic device connected to a communications network. For example, but not as a limitation, a removable device may be portable or removable data storage such as a removable drive or disk or may be a device that includes memory such as a PDA, a digital camera, or the like. The particular device or media is not limiting to the invention with a significant aspect being that any of these devices may be used to remove data from a client computer or node. The removable device or media may comprise USB flash drives and other portable memory devices such as floppy disks, ZIP disks, mapped or substituted drives, and the like.

Figure 1:
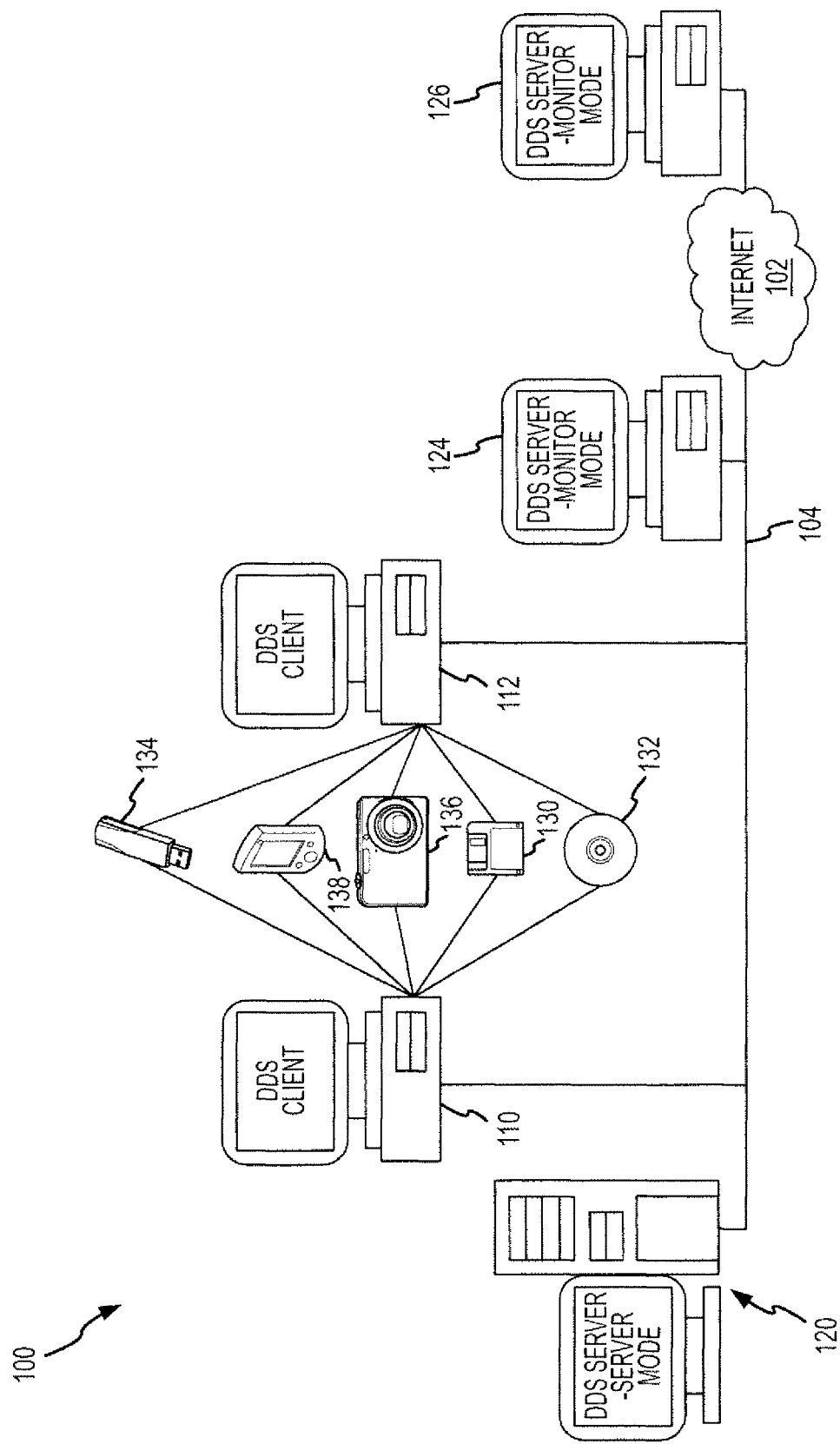
FIG. 1 illustrates an exemplary device detection system showing multiple network nodes or devices being uses to monitor use of removable or portable devices such as data storage devices in one or more client computers or nodes.

FIG. 1 illustrates an embodiment of a device detection system 100 that is useful for detecting and reporting the use of removable devices at client computers or nodes. The system 100 includes client computers 110, 112 linked to a network 104 that may allow the computers 110, 112 to access information in memory devices (not shown) attached to the network 104. Each of the client computers 110, 112 runs a DDS client application to monitor the attachment and removal of one or more removable media such as a floppy disk 130, a CD or DVD 132, a USB flash drive or other USB device 134, a digital camera 136, a PDA or Bluetooth device 138, or other removable device or media. The system 100 further includes an administrator or central computer 120 that runs or executes a DDS server application in server mode. The system 100 may also optionally include other computers or computing devices 124, 126 that run the DDS server application in monitor mode so as to allow operators (such as IT managers, network security managers, and the like) to manage or monitor use of the client computers 110, 112 via information transmitted by the DDS server application on the administrator or central computer 120 over the private or organization computer network 104 or a public network such as the Internet 102.

In one embodiment, the DDS client application executing on the client computers 110, 112 is not visible to the user of the computer 110, 112. Such invisibility of the DDS client application reduces the risk that the user will stop or pause the DDS client application. The DDS client application may be installed on the client computer 110, 112 in some cases. Alternatively, the application may be placed in a public directory, such as in a directory in the memory of central computer 120 or elsewhere, and a login script used to login a user on the client computers 110, 112 may be configured to execute the DDS client application. This alternative embodiment is useful because if there is an update to the DDS client application it can be affected by changing the DDS client application stored in system memory such as in computer 120. Otherwise, the DDS client application may be adapted to have automatic updating capabilities to facilitate later modifications on the computers 110, 112. The DDS client application preferably functions, as explained below, to detect most if not all removable media such as to detect disks 130, CDs/DVDs 132, USB drives or devices 134, digital cameras 136, PDAs or similar devices 138, ZIP disks, other drives, and the like.

During operation of the system 100, the DDS server application on the administrator or central computer 120 reports violations of a removable media policy to an IT manager such as an operator of the computer 120 or computers/nodes 124, 126 by visual or audio signals or via e-mail, instant messaging, phone calls, or other communication techniques. The computer 120 that runs the DDS server application may be caused by the application to display a visual warning, sound an audible alert, and/or display on a monitor screen or otherwise output/report a list of devices added and/or removed from one or more computers 110, 112 that are ruing the DDS client application. The displayed or reported list typically is also written to a log in the memory of administrator or central computer 120. The format of this log often will be plain text but may also be stored in spreadsheet, database, or other form. In one embodiment, the log is stored as a CSV (i.e., plain text, comma separated values) file making it easy to later convert into other forms, and further, the log file may be encrypted prior to storage. The DDS server application on the administrator computer 120 also preferably has the ability to ignore certain users or devices such as users who have authority to use a particular removable device or devices that are permitted in a system 100. For instance, a user may have permission to use a removable device, such as a digital camera, in the system 100. The DDS client application on the computer 110, 112 detects and reports the addition and removal of the camera to the DDS server application on computer 120, which would determine the use is authorized. The message or event typically is logged but a notification or warning generally would not be generated or issued to an IT manager. Preferably, a list of permitted uses and/or devices could be updated or changed by an authorized operator or user of the computer 120 through the UDS server application.

Figure 2:
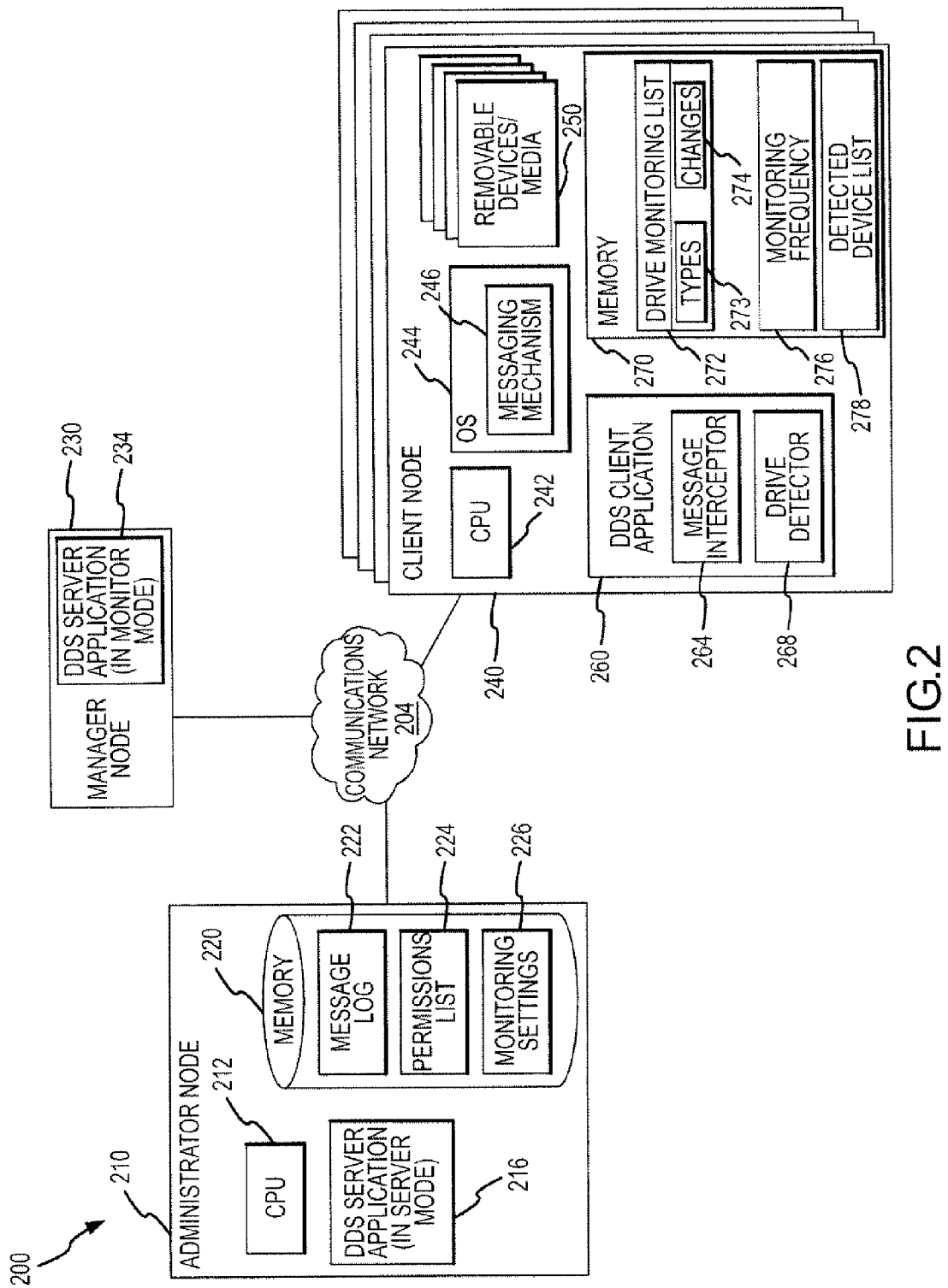
FIG. 2 illustrates in block diagram form a device detection system, such as may be used in the system of FIG. 1, illustrating software portions of such a system as well as representative information stored in system memory.

FIG. 2 illustrates in functional block form a device detection system 200 that includes an administrator node or computer 210 adapted for monitoring a plurality of client nodes or computers 240 via data transferred over a communications network 204. More specifically, the administrator node 210 includes a processor or CPU 212 that manages memory 220 and executes a DDS server application 216 to process device detection messages or events transmitted by a DDS client application 260 executing on each of the client nodes 240. Within the memory 220, the DDS server application 216 stores all or a subset of the messages from the DDS client application 260 in a message log 222. The DDS server application 216 also stores a current permissions list or settings 224 that defines for users of the client nodes 240 any removable devices they are authorized to use on the client node and/or lists particular removable devices for which use is acceptable such as a smartcard used for identification or the like. The DDS server application 216 also stores monitoring settings 226 that allow an operator of the node 210 to set monitoring parameters such as monitoring frequency for checking for device changes, the changes to monitor, and/or other parameters.

On the administrative or administrator node 210, the DDS server application 216 is run in server node to receive and process the messages while the system 200 is also shown to include a manager node 230 linked to the network 204 that runs the DDS server application 234 in a monitor mode that allows a user of the node 230 (e.g., a PDA, wireless notebook or the like, or other electronic communication or computing device) to monitor chances in the client node device use without storing messages in a log 222 or processing incoming messages from the client nodes 240.

At the client node 240, a processor or CPU 242 is provided that manages memory 270 and runs or executes a DDS client application 260 that is operable to detect the presence of removable devices or media 250 and its removal from the node 240. An operating system 244, such as Microsoft's Windows™ OS or the like, is provided on the client node 240, and, as shown, the OS 244 includes a messaging mechanism or pump 246 (or such a mechanism may be provided as a function of each program running within the OS 244) that generates a message for each event including the attachment or removal of the removable devices 250. The ODS client application 260 includes two programs or subroutines for detecting the removable devices 250 including a message interceptor 264 for intercepting the messages from the messaging mechanism(s) 246 and a drive detector 268 for detecting devices or media that cannot readily be detected by the interceptor 264, such as devices that were attached prior to powering up the node 240. The operation of the client application 260 is discussed in more detail below. Memory 270 is used by the DDS client application 260 to store a drive monitoring list 272 providing information on the types of drives and devices 273 that have been detected and a list of changes 274 that are to be monitored by the application 260 (e.g., as defined by the DDS server application 216). The memory 270 may also store one or more monitoring frequency definitions used by the DDS client application for determining how often to look for the presence of or changes to the drives or to devices 250. Further, the memory 270 may store a list 278 of the devices 250 that are detected by the DDS client application 260 to be present on or attached to the client node 240. With the components of the system 200 briefly described, it may now be useful to describe in more detail exemplary operations and functionality of the system 200 and the interaction of its components.

The message interceptor 264 represents a procedure or procedures used by the DDS client application 260 to intercept messages that identify the addition or removal of devices 250 such as messages issued by the messaging mechanism 246 of OS 240. In one embodiment of the client node 240, the DDS client application 260 is configured to contain one or more sub-classed functions to provide the message interceptor 264. In this sense, "sub-classing" is an ability of the application 260 to replace a major function of a program with another function. For example, programs running in a Windows™ version of the OS 244 such as programs with a graphical interface each have a special function called winproc, which is a shortened form of Windows Procedure. Winproc operates a message pump (e.g., may be considered the mechanism 246) that reports to the program certain events. In this OS 244, a message is an event such as a mouse click, color change, program start, or the like, and the message pump 246 sees each of these messages as it occurs. However, winproc ignores all of the messages not meant for the related program. In the client node 240, the DDS client application 260 sub-classes a different winproc or message interceptor 264 that intercepts messages that identify the addition or removal of removable devices 250. In some embodiments, after the desired action has been taken by the new winproc or interceptor 264, the old winproc or messaging mechanism 246 is called to execute all of the tasks it is supposed to take care of under the OS 244.

When a removable device 250 is detected by the message interceptor 264, it is put in a list 278 along with relevant monitoring information including, in some cases, the date and time the message occurred (i.e., when the device was attached or removed at the node 240), a message ID (which is typically given by the messaging mechanism or message pump 246), and a description of what the message means (e.g., by defining the device removed, by defining the device removed, or the like). Such a sub-classing of winproc (e.g., providing a message interceptor 264 to intercept event messages related to the removable devices 250) is effective for detecting USB media, CD/DVDs, digital cameras, and many other removable drives 250. However, the message interceptor 264 typically cannot detect the presence of certain device 250 such as floppy and ZIP disks, and to provide such detection, the drive detector 268 is provided and its functionality complements the detection provided by interceptor 264.

The drive detector 268 is a function that loops through to look at each possible drive (such as drives "A:" to "Z:") or more typically those in a type list 273 defined by an administrator via monitoring setting definitions 226. The detector 268 acts to indicate whether a drive exists and, if it does, the drive's attributes. When the OS 244 comprises Microsoft Windows™, the drive detector 268 may be provided, at least in part, by the Windows™ API function "GetVolumeInformation" as the function that acts through a loop to look at all drives or drives in a types list 273. For example, the detector 268 may act to detect or monitor CD/DVD drives, hard drives, RAM drives, remote drives, removable drives, and more, and DDS server application 216 typically is used to define a subset of such drive types to monitor such as with the type list 273, which can preferably be modified by an operator of the administrator node 210. For example, a managing IT department may set a removable drive policy that defines drives to monitor and this may often exclude hard drives. Note that the drive detector 268 will generally detect the drives that were found by the message interceptor 264, and hence, some embodiments of the invention may only use the drive detector 268. However, some preferred embodiments use both detectors because the message interceptor 264 provides real time or nearly instantaneous detection of changes in the removable devices 250 on node 240 while the drive detector 268 overcomes limitations of the interceptor 264 because it detects devices or media 250 that would not be found by interceptor 264 (e.g., if a user inserted removable media 250 into the node or computer 240 while it was turned off and then turned the node or computer 240 on, the interceptor 264 would not detect the media 250). The checking of the drives or looking for devices 250 by the drive detector 268 is typically performed periodically at intervals set by an administrator such as by setting a monitoring frequency 276. Drives or devices 250 detected by the drive detector 268 are stored in a detected drive list 278.

Communications between the DDS client application 260 and the DDS server application 216 may be handled in a variety of ways to practice the invention including the use TCP protocols (e.g., when the OS 244 is Windows, communications may be handled using Microsoft's Winsock controls using the TCP protocol with "Winsock" being short for Windows Socket an API for developing Windows programs that can communicate with other machines via the TCP/IP protocol). During operations of the system 200, when the DDS client application 260 connects to the DDS server 216, application 260 sends login information that indicates the client computer 240 IP address, computer name, and user login ID. The DDS server 216 then informs the DDS client 260 what drive types 273 to monitor and how often to check for them such as by defining frequency 276. The DDS client 260 sends any devices or drives 250 that it may have stored previously in its lists 278. A new drive check is performed by the drive detector 268, and the updated list 278 is sent to the DDS server 216 over network 204 so that the DDS server 216 has an up-to-date picture of what drives (e.g., in log 222 or other file in memory 220) are present or attached on the client node 240. Communications between the DDS client 260 and the DDS server 216 typically then stop or are halted until one of the following occurs: (1) a device or drive 250 insertion or removal is detected such as by interceptor 264 and/or detector 268; (2) a device drive 250 is added or removed or status changes (e.g., goes online or offline) such as may be detected by interceptor 264 and/or drive detector 268; or (3) the DDS server 216 changes the types 273 of drives 250 to monitor, the changes to monitor 274, or the monitoring or refresh frequency 276.

Figure 3:
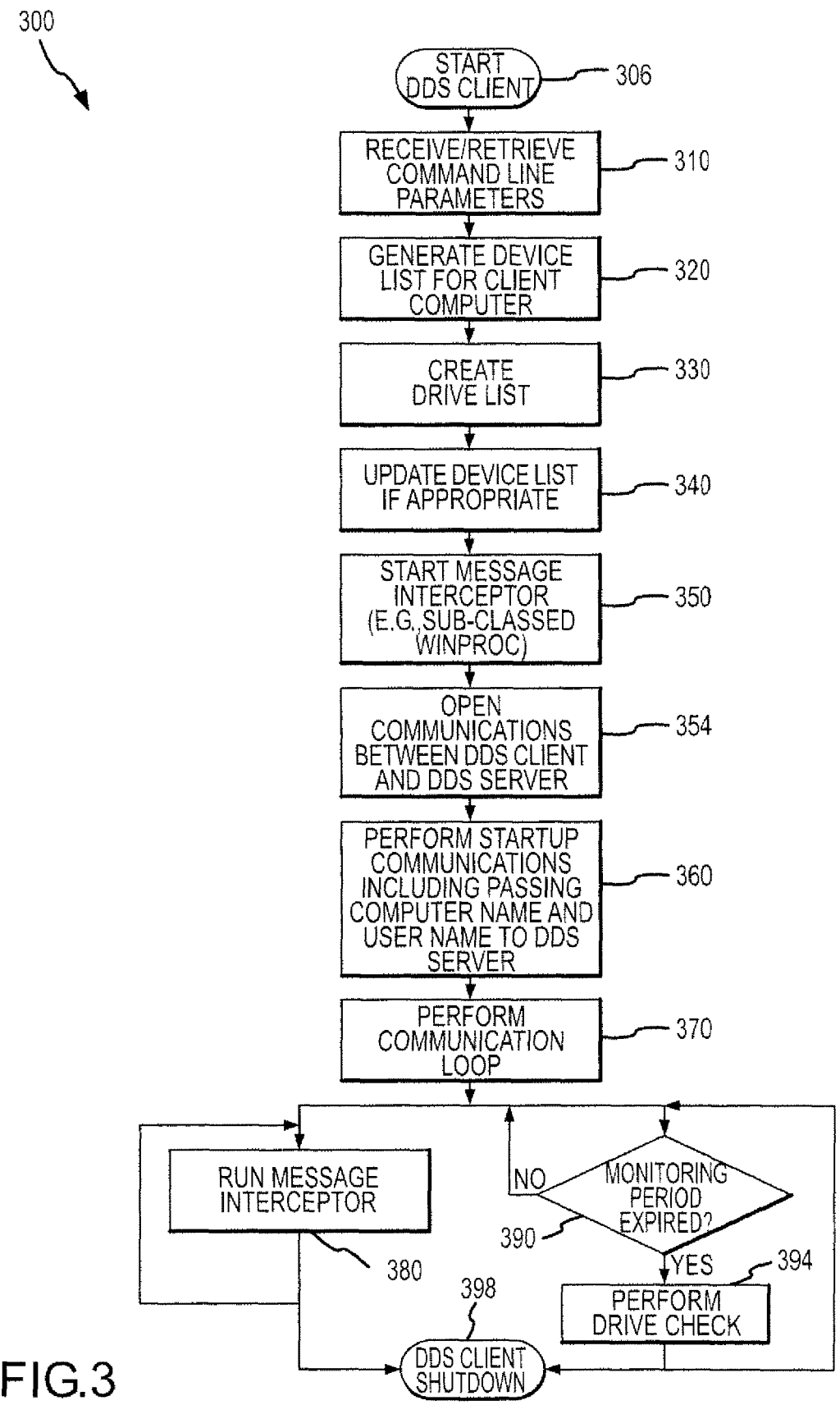
FIG. 3 is a flow diagram illustrating a representative device detection method in accordance with an embodiment of the invention such may be carried out in the systems of FIGS. 1 and 2.

FIG. 3 illustrates a device detection method 300 in accordance with one embodiment of the present invention, and the method 300 will be described with reference to the device detection system 200 of FIG. 2 although the method 300 may be readily implemented in differently configured systems and/or networks. The method 300 begins at 306 with start up of a DDS client application 260 upon a client node or computer 240. The DDS client 260 may be installed upon the client 260 or may be provided elsewhere in the system 200 and run as part of the login script executed by the CPU 242 at power up of the client computer 240. At 310, when the DDS client 260 is started it looks to see if it has been passed any command line parameters. These parameters may include the IP address or computer name of the server or administrator node or computer 210 running the DDS server 216 and also may include the server port to connect to for communicating messages or gathered device information to the DDS server 216. If these parameters are not present or passed, then the DDS client 260 retrieves the parameters by checking the settings (e.g., stored in the registry in memory 270) to see determine the last or previously used IP address and port.

At 320, the DDS client 260 generates a device list 278 for the client computer 240. The registry or memory 270 is checked to see if there are any items (e.g., detected devices or changes in devices) remaining that were not sent to the DDS server 216 during the prior or last session. If there are any items remaining, they are placed in the device list 278. In one embodiment, the device list 278 has a "type" field, and these added, remaining devices are given a type to indicate their source such as with a "0" to indicate they were discovered by the sub-classed winproc function or message interceptor 264. If there are no devices at 320, then the device list 278 remains empty.

At 330, the DDS client application 260 acts to create a drive list for the client computer 240. The DDS client 260 again checks the registry or memory 270 for any drives that were not sent or reported to the DDS server in the prior or last DDS client session. These drives, if any, are placed in the device list 278 with a different type, such as type "2", to indicate they are drive changes. At 340, a complete list of drives currently attached to the computer 240 is generated such as by operation of the drive detector 268 and this drive list is added to the detected device list 278 with the drives being typed, such as with a drive type "1", to indicate the drives are current drives for the computer 240. At 350, the DDS client 260 starts the message interceptor 264 such as by starting a sub-classed winproc when the OS 244 is Microsoft Windows™ as explained above. The message interceptor 264 acts to identify the addition or attachment of removable devices and removal of such devices from the computer 240 (or of a set of changes 274 that are to be monitored) by intercepting messages from one or more message pumps that transmit message upon the occurrence of events on computer 240.

At 354, communications between the DDS client 260 and the DDS server 216 are opened over network 204. If the opening was successful, a number of actions may occur at 360 during initial or start-up communications. First, the DDS server 216 transmits version information to the DDS client 260. This information is used by the DDS client 260 to determine whether any new commands that may have been added to the client 260 are not used in older versions. Second, the DDS client 260 transmits login information including the name of the client computer 240 and the name or ID for the user of the computer 240 (e.g., the users login ID obtained from the OS 244 environment), e.g., by transmitting a > LOGIN computer_name user_name message (i.e., a login message with computer name and user name data fields) to the DDS server 216. Third, the DOS client 260 waits for an acknowledgement or "OK" response from the DOS server 216 that indicates that communications have been established. If the response is not received in a certain amount of time, the DDS client program 260 will continue but communications will not be sent or received. Any devices or drives discovered are stored by the DDS client 260 in the device list 278 for later reporting to the DDS server 216.

At 370, the method 300 includes performing a communication loop that generally includes a transmit portion from the DDS client 260 and a receive portion in which data is (or commands are) transmitted from the DDS server 216 to the DDS client 260. In the transmit portion, if there are items in the device list 278, then for each item in the list 278 the DDS client performs the following: (i) if the type indicates a device found (e.g., type "0"), transmit a device message providing at least an identifier for the device and more typically also the date and time and other information (e.g., a > DEV date time device_id device_message message where the data fields have been stored in the item when it was created by the DDS client application 260); (ii) if the type indicates a drive was found (i.e., the type is "1" in the above example), transmit a drive found message providing the drive identification information and likely the time and date that it was found (e.g., transmit a > DRIVE date time drive_info message where the fields have already been stored in the registry or memory 270); and (iii) if the type indicates a drive change was identified or detected (e.g., the type is "0"), transmit a drive change message including identification of the drive effected and the detected change (e.g., transmit a > DRIVECHANGE date time change_info message).

The transmit portion of loop 370 may further include testing the connection between the DDS client 260 and the DDS server 216 such as by using a "TEST" command. For example, the DDS client 260 may transmit or send a > TEST num message where "num" is a random number. The DDS server 216 responds with "num" that is the exact same number that was transmitted to verify the connection. The transmit portion of loop 370 may also include checking the version of DDS client 260 at any time such as by issuing a "VER" command/message to the DDS server 216, and the version information, e.g., the same as obtained during the connection process, will be sent from the DDS server 216.

The receive portion of the loop 370 may include receiving changes in the monitoring frequency, the changes to be monitored, or other parameters used by the DDS client 260. For example, updating the DDS client 260 settings may be performed by the DDS server 216, such as by using the "SETTINGS" command. In this case, the DDS server 216 may transmit, for example, a > COMM server_ip port timeout message or command to the DDS client 260 (where server_ip is the IP address of the IP server 216, port is the DDS server port number for the DDS client 260 to connect to, and timeout is the amount of time (e.g., in seconds) to wait for a connection) and then transmit commands that define the types 273 of drives to monitor (e.g., a "DRIVEMON" message) and/or the types of changes 274 to monitor (e.g., a "DEVICEMON" message). For example, the drive type parameter message or DRIVEMON message may indicate a number of drive types to monitor and also set other parameters such as drive refresh time, floppy refresh time, and the like (e.g., a > removable fixed remote cd_dvd ram_disk drive_refresh floppy_refresh message is an exemplary message with useful data fields). This information tells the DDS client 260 that drive types to monitor and the refresh time to use during device detection operations. For example, the device change parameter message or DEVICEMON message may indicate a number of specific device changes to monitor (e.g., a > device_arrival, device_remove_complete, config_change_canceled,
> config_changed, device_query_remove, device_query_remove_failed,
> device_remove_pending, device_type_specific, query_change_config,
> user_defined message is an exemplary message with representative but not limiting data fields). In some cases, a comprehensive listing of possible changes to monitor may be transmitted with a setting provided for each change indicating whether an administrator chose or selected the change for monitoring such as via a user interface or screen provided at the administrator node 210 by the DDS server 216 (e.g., a "0" may be used to indicate that a change should not be monitored while a "1" may be used to indicate a change should be monitored but, of course, other settings or indicators may be used to provide such information to the DDS client 260).

The device detection method 300 continues at 380 with the message interceptor 264 (e.g., a sub-classed winproc function) running on the client node 240 to detect removable devices 250 and/or to detect specific changes defined by DDS client parameters (e.g., changes 274 in memory 270). For example, the message interceptor 264 may monitor for events or messages from messaging mechanism or pump(s) 246 that indicate one or more of the following: device arrival, device removal completed, configuration change cancelled, configuration changed, device query removed or failed, device removal pending, and the like including changes specified by a system administrator via the DDS server 216. A message is intercepted and determined to be relevant to device detection (such as a uMsg that is a WM_DEVICECHANGE message in embodiments using a sub-classed winproc function). The message is then processed by the DDS client 260 to determine if the changes defined in the program parameters (e.g., changes list 274 in memory 270) are effected by the message (e.g., in the subclassed winproc function embodiment, the parameter or "wParam" list may include one or more of DBT_DEVICEARRIVAL, DBT_DEVICEREMOVECOMPLETE, DBT_CONFIGCHANGECANCELED, DBT_CONFIGCHANGED, DBT_DEVICEQUERYREMOVE, DBT_DEVICEQUERYREMOVEFAILED, DBT_DEVICEREMOVEPENDING, DBT_DEVICETYPESPECIFIC, DBT_QUERYCHANGECONFIG, and DBT_USERDEFINED). If the message parameter fits any of the preset cases and that device change is monitored then the DDS client 260 creates a new log, entry or item in the device list 278. The new item or entry may include filling in the following data fields: detected device, time such as current date and time, type indicating device change (such as "0"), and description such as a short description of the case or event (e.g., "device arrival," "device removal", and the like). The message interceptor 264 may operate 380 to then call subclassed function to perform its normal job (e.g., call the old winproc to do its normal job).

The method 300 may in parallel to step 380 include determining whether the monitoring period has expired at 390 by the DDS client 260 based upon the definition of the monitoring frequency 276. If so, then a drive check is performed at 394 by the drive detector 268. At the predetermined amount of time (e.g., established by the received DRIVEMON command from the DDS server 216), the DDS client 260 such as via the drive detector 268 performs the following: (i) get or detect a list of the current drives; (ii) compare the new list of drives with the old list stored in memory 270 or elsewhere; and (iii) if there are changes, create a new item or log entry in the device list 278 for each change. The new log items for step (iii) may include: time defining the current date and time, type indicating a drive change (e.g., type "2"), and a description of the change defining the kind of change that occurred. If the change is a new drive, the DDS client 260 may issue a command or message (e.g., a DRIVE command) for the drive. Typically, if the change is not a drive removal, a DRIVE command or similar message is issued for the changed drive. At 398, the method 300 may terminate by shutting down the particular DDS client 260 on the computer 240. This may include stopping the message interceptor (e.g., stopping the sub-classed winproc and restoring the original winproc), saving any items that may remain in the device list 278 in memory 270, and saving the DDS client 260 settings or parameters (e.g., the DDS server address, port, monitored drive types 273, and refresh time 276) to the memory 270.

With general operation of device detection systems and of DDS client applications understood, it may be useful to further describe operation of an exemplary DDS server application. Compared with the DDS client, the DDS server is a relatively simple application or program, but it is typically configured to provide a graphical user interface (GUI) that may require further explanation. A DDS server GUI 400, 500, 600, 700, and 800 is shown in FIGS. 4-8 as it may appear during operation of a device detection system and in response to a user or operator selecting one or more tabs (or buttons or the like). A DDS server generally operates to collect all the input gathered by the DDS clients and to process the collected input and report/display it in an organized fashion for use by a system administrator or other user. The data is also stored for later review, reporting, transmittal to remote manager nodes, or the like. The DDS server may be configured to run in one of two differing modes: server mode and monitor or manager mode. It is preferable that there be at least one DDS server application running in server mode to accept and process messages from the DDS clients in the device detection system. The monitor mode is used to allow multiple DDS server applications to run on remote but networked manager nodes or computers to display collected device detection information from the DDS clients, e.g., to allow multiple IT managers or others view what is happening in a particular network or on a particular client computer from different work stations or nodes including when they are traveling or at home. The DDS server application running in server mode may in some embodiments operate to inform an IT manager or other personnel of alerts. Notifications may be visual displays and audible alerts on the central or administrator node or on any of the monitoring, networked devices. The notifications or reports may also include alerts sent through e-mails, instant messages, text messages, page calls, cell/wireless/other phone calls, or other messaging techniques.

Figure 4:
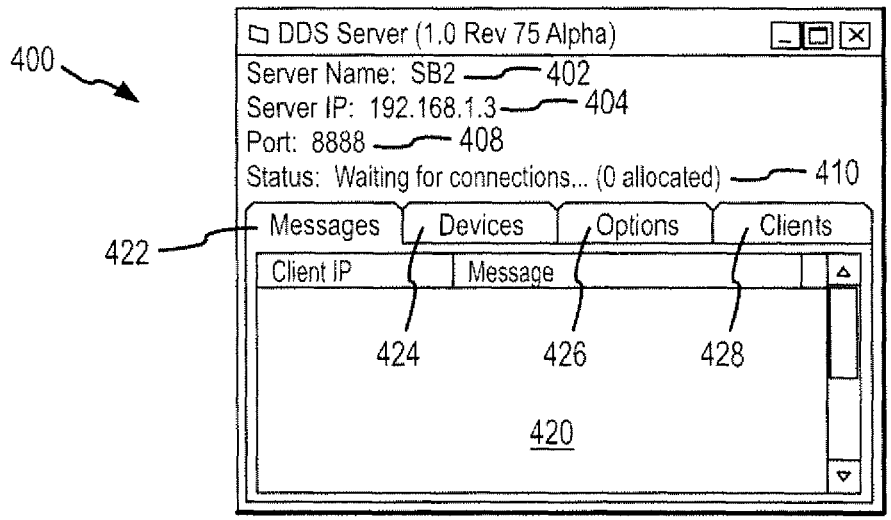
FIGS. 4-8 are screen shots of a graphical user interface (GUI) that may be generated on an administrator or central computer during operation of a DDS server application such as the DDS server application shown in the system of FIG. 2.

A main screen of a DDS server GUI 400 is shown in FIG. 4. Information may be displayed including the DDS server's name 402, the server's IP address 404, and the server's port 408. Other information that may be shown in GUI screen 400 includes the status of the DDS server application 410 which may be used to set forth if a communication connection is established with one or more DDS clients and if so, how many such connections have been allocated. During operations, these allocation will change and the information updated. In one embodiment, a dynamic array of Winsock controls is used to create the connections to the DDS clients. As the array grows, the number of allocations shown at 410 increases. When the number of connections drops, the allocations may not decrease until enough have been eliminated to remove the Winsock controls. As shown, a window 420 is provided and the information shown in the window 420 depends upon which of a set of tabs is selected including a messages tab 422, a devices tab 424, an options tab 426, or a clients tab 428.

Figure 5:
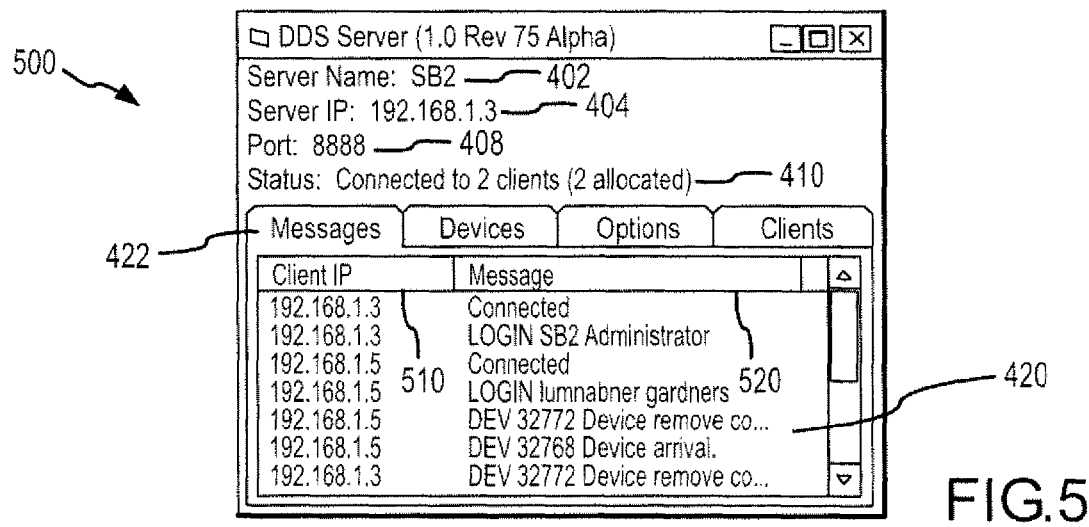
Figure 6:
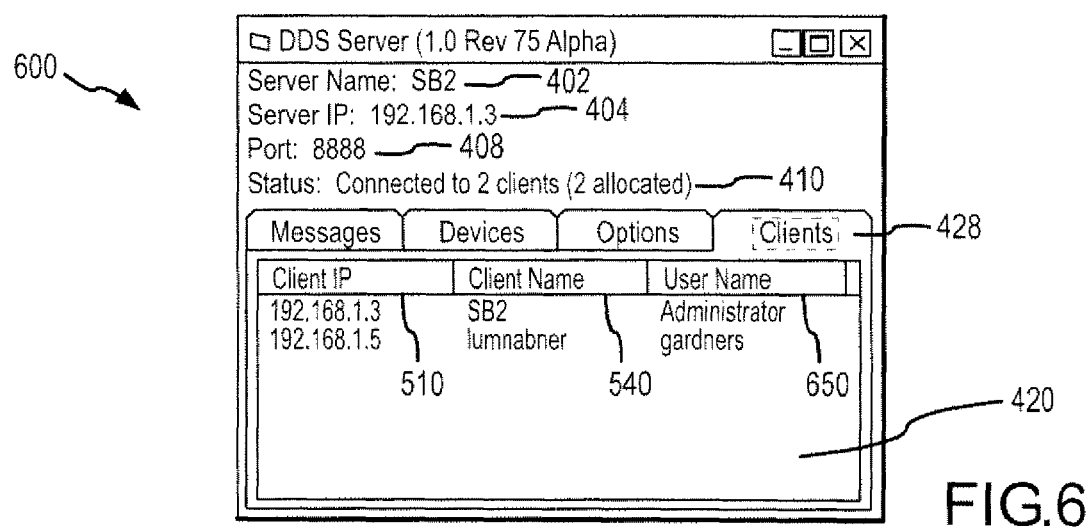

When the messages tab 422 is selected as shown in GUI screen 500 of FIG. 5, the DDS server acts to display in window 420 all messages received by and transferred from the DDS clients. The messages are arranged in a client IP address column 510 and a message column 520 displaying message contents, which although not shown typically would include date and time in the message column 520 or in a separate column(s). The messages tab 422 is used mostly to find any problems with a particular DDS client, e.g., a DDS client that is having trouble communicating with the DDS server. When the clients tab 428 is selected as shown in GUI screen 600 of FIG. 6, a set of information is displayed that is arranged by the client IP address column 510, a client computer name column 640, and a user name column 650. As shown in FIG. 6, the client tab 428 can be selected to have the DDS server act to display in window 420 all the client nodes that are currently connected to the DDS server. A user such as an IT manager may also be able to view clients not currently connected in some embodiments. When a particular client displayed in window 420 of GUI screen 600, additional information is displayed for the client such as the current drive statistics, device alerts, individual settings, and the like. Screenshots can be printed or saved/copied, and an operator may also manipulate the GUT 600 to send messages, deactivate programs, disconnect drives and/or attachments, shutdown computers, and other management actions relevant to monitored client computers. In some embodiments, several client computers may be viewed at one time which allows enhanced monitoring and can also facilitate IT troubleshooting of common computer problems (e.g., when an operator of a client computer calls IT with a problem, a computer technician can see the user's screen to view or monitor the ongoing problem).

Figure 7:
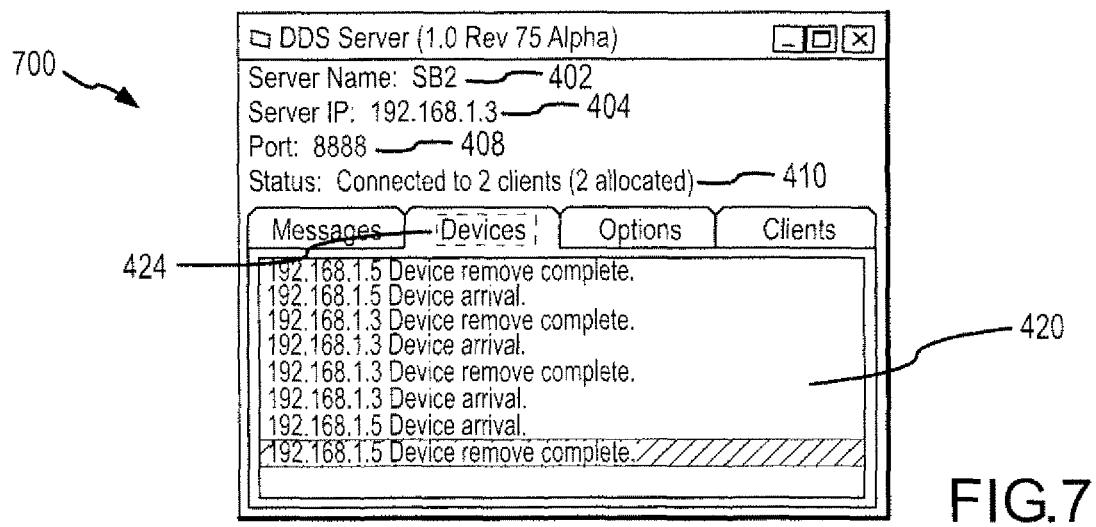

When the devices tab or "alert" tab 424 is selected as shown in the GUI screen 700 of FIG. 7, the DDS server operates to provide in window 420 all or a subset of the device alerts received by the DDS server. This displayed alert information provides a listing of IP addresses of "offending" computers or client nodes as well as a description of the received alert (e.g., device removed, device attached, and the like which may vary with the removable device policy being enforced in a computer network). An operator can select such as by double clicking a particular alert message to retrieve or display more information on the client computer (e.g., the same or similar information as pulled up when a client is selected from GUI screen 600 after the clients tab 428 is selected). When an alert is received, the DDS server may provide or play a warning sound and/or display a visual signal or warning (not shown) on the GUI screen 700. In some embodiments, the sound and visual warnings can be set and modified/defined by selecting the options tab 426 of the DDS server GUI.

Figure 8:
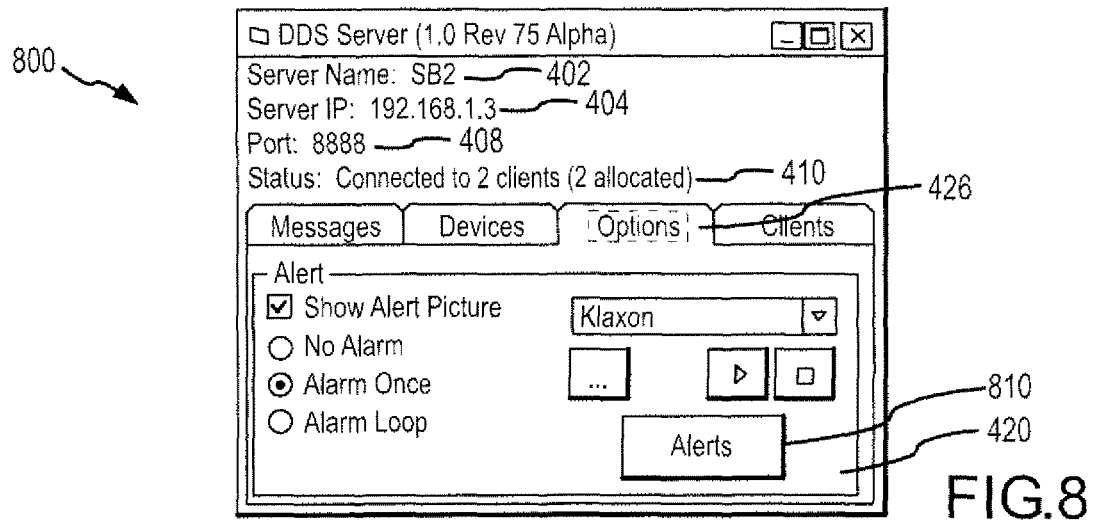

As shown in the GUI 800 of FIG. 8, selecting the options tab 426 causes the DDS server to provide selection boxes, pull downs, and/or other data entry mechanisms in the window 420 to provide a user the ability to control how the audible and visual alerts are activated or provided. From this GUI 800, the visual alert can be deactivated or changed, and the audible alarm can be deactivated, played once, made to loop, or otherwise defined/modified such as by changing the sound used for an alert. The "Alerts" button 810 may be selected to allow a user to indicate which device changes that are being monitored should result in an alert. In some embodiments (not shown), a drive alerts button may be provided to allow an operator to set drive type monitoring parameters. The GUI 800 may also be configured to allow an operator to change the display provided for visual alerts.

At the administrator node or in other memory, the DDS server uses a log file to store all or a subset of the messages from the DDS client applications. Messages are typically kept for a predefined period, such as 30 days or the like. The log file may be a simple CSV file (plain-text, comma separated values file) that may take include the following data fields: date (e.g., receipt date of the message), time (e.g., receipt time of the message), message source (e.g., "C" indicating a client to server message and "S" indicating a server to client message), the client's IP address, and the message (e.g., the actual message content that was received or sent). Events that are in the log file preferably are all messages between the DDS server and the DDS clients over a particular period of time.

The following table provides commands or messages that may be issued in one embodiment of a device detection system by the DDS server or the DDS client, e.g., an embodiment provided within a Microsoft Windows and Winsock environment in which the message interceptor is provided by a subclassed winproc function. In the table, commands are shown in uppercase and parameters are shown in lowercase italics. Spaces are indicated by the symbol "●" and tabs are indicated by the symbol "→". However, in practice, commands may be issued in uppercase or lowercase, with uppercase being used in the table for clarity.

| | | | Description | |
|---|---|---|---|---|
| Client/Server | Command | | Parameter | Meaning |
| Login Communications | | | | |
| Server | version_id | | When a connection is established the DDS server starts communications by sending its version. | |
| | | | Version_id | The current version of the DDS server |
| Client | LOGIN.comp_name.user_id | | The second thing sent is the client's login information. The computer name will help identify the location of the computer if it needs to be located. The user ID will identify the offending user. | |
| | | | comp_name | The client computer's name. |
| | | | user_id | The client user's login id. |
| Server | OK | | OK is the response sent from the server after the LOGIN command. There are typically no parameters. | |
| Server | DEVICEMON.parameters | | This command identifies the types of device changes that the DDS client sends to the DDS server. This command is sent after the DDS client logs in but may also be issued again if the IT manager changes the device changes using the DDS server. There is typically not a response from the DDS client. | |
| | | | parameters | |
| Server | DRIVEMON.remove, fixed, remote, cd, ram, drive_refresh, floppy_refresh | | The command identifies the types of drives the DDS client monitors for changes, and this command also specifies the amount of time that should elapse before scanning | |

-continued

| Client/Server | Command | Description Parameter | Meaning |
|---|---|---|---|
| | | | the drives again. Please note that there are no spaces between the parameters. This command is sent after the DDS client logs in but may also be issued again if the IT manager changes the device changes using the DDS server. There is typically not a response from the DDS client. |
| | | remove, fixed, remote, cd, ram | These are the five different types of drives that the DDS client can monitor. To indicate that a drive type be monitored the parameter could be 1. To indicate that a drive type not be monitored the parameter could be 0. |
| | | drive_refresh | The amount of time (in seconds) that will pass before the drives are scanned again. |
| | | floppy_refresh | The amount of time (in seconds) that will pass before the floppy drives are scanned again. |
| | Device/Drive Changes | | |
| Client | DEV.date.time.device_id. description | | Sent by the DDS client when a device change has been detected. The DDS server will typically not send a response. |
| | | Date | The date that the device change occurred. Format is MM/DD/YYYY. Leading zeros may be used. Year may be 4 digits. |
| | | Time | The time that the device change occurred. Format is HH:MM:SS. Time may be in 24-hour format. Leading zeros may be used. |
| | | device_id | Identification number of the device change that occurred:<br>✓ devicearrival = 32768<br>✓ deviceremovecomplete = 32772<br>✓ configchangecanceled = 25<br>✓ configchanged = 24<br>✓ devicequeryremove = 32769<br>✓ devicequeryremovefailed = 32770<br>✓ deviceremovepending = 32771<br>✓ devicetypespecific = 32773<br>✓ querychangeconfig = 23<br>✓ userdefined = 6 |
| | | description | Short description that is provided with the device_id. Respectively, the descriptions are:<br>✓ Device arrival<br>✓ Device remove complete<br>✓ Configuration change canceled<br>✓ Configuration changed<br>✓ Device query remove<br>✓ Device query remove failed |

-continued

| Client/Server | Command | Parameter | Meaning |
|---|---|---|---|
| | | | ✓ Device remove pending<br>✓ Device type specific<br>✓ Query change configuration<br>✓ User defined |
| Client | DRIVE.date.time.drive_letter→drive_type→status→serial_no→volume→label | Sent by the DDS client when a new drive or a drive change (besides removal) has been detected. The DDS server typically will not send a response. After login the DDS client will send a list of drives found. After that first list, it will send the DRIVE command if it finds a new drive or if a drive changes. | |
| | | Date | The date that the drive was found. Format is MM/DD/YYYY. Leading zeros may be used. Year may be 4 digits. |
| | | Time | The time that the drive was found. Format is HH:MM:SS. Time may be in 24-hour format. Leading zeros may be used. |
| | | drive_letter | Letter of the drive found. May be followed by a colon. |
| | | drive_type | Type of drive. Possible types are:<br>✓ Removable<br>✓ Fixed<br>✓ RAM Disk<br>✓ Remote<br>✓ Removable |
| | | status | Status of the drive. Possibilities are:<br>✓ Off-line<br>✓ Active |
| | | serial_no | Drive serial number. Although this is plain text, this field is sent as decimal, not hexadecimal. For drives that are off-line this field will be 0. |
| | | volume_label | The volume label of the drive. For drives that are off-line this field will be empty. Volume labels may contain spaces (hence the use of tabs to separate fields.) |
| Client | DRIVECHANGE.date.time.drive_letter→change_no→old_data→new_data | Sent by the DDS client when a drive change has been detected. These changes could be change in drive type, drive status, drive serial number, or volume label. Change number 1 (drive removed) does not use the old_data or new_data fields. | |
| | | date | The date that the drive change was found. Format is MM/DD/YYYY. Leading zeros may be used. Year may be 4 digits. |
| | | Time | The time that the drive change was found. Format is HH:MM:SS. Time may be in 24-hour |

-continued

| Client/Server | Command | Parameter | Meaning |
|---|---|---|---|
| | | drive_letter | format. Leading zeros may be used. The letter of the drive that has changed. Followed by a colon. |
| | | change_no | The change number. Possibilities are:<br>✓  1 = Drive removed<br>✓  2 = Drive type changed<br>✓  3 = Drive status changed<br>✓  4 = Drive serial number changed<br>✓  5 = Drive volume label changed |
| | | old_data | The old data that was changed. For example the old volume label. Note: change type 1 (Drive removed) does not use old_data or new_data. These are not empty fields, they are not present. |
| | | new_data | The new data that was changed. Example: the new volume label. |
| | Server Commands | | |
| Server | SCREEN.auto_time | | Requests that the DDS client send screen captures to the DDS server. DDS client will respond with the SCREENDATA command. |
| | | auto_time | How much time should elapse (in seconds) before automatically sending the next screen shot. 0 indicates a single screen shot. |
| Client | SCREENDATA.data_size | | Command that indicates to the DDS server that a screen shot is arriving. Data_size tells the server how many bytes will be arriving. |
| | | data_size | The amount of data (in bytes) that will be sent in the next message. |
| Client | data | | The screen shot data. |
| | | data | JPEG picture of the client's desktop. |
| Server | DRIVELIST | | Requests that the DDS client send the drives to the DDS server again. |
| | Client Commands | | |
| Client | VER | | Requests that the DDS server send its version information again (same as what was received when the connection was established.) Server will respond with the version_id. |
| Client | TEST.test_num | | Tests the connection between the DDS client and the DDS server. Server will respond with the exact same test_num. |
| | | test_num | Random number picked by the DDS client. |

We claim:

1. A system for monitoring use of removable devices in client computers that are linked to a network, comprising: a device detection, server application running on a first computer linked to a communications network; a second computer linked to the communications network, the second computer being configured for attachment and removal of removable media; and a device detection client application running on the second computer to detect presence of the removable media on the second computer and in response to the detection of the presence to transmit a message to the device detection server application, wherein the device detection client application detects the removable media using both a message interceptor intercepting messages in the second computer and a drive detector detecting existing drives in the second computer,
wherein the intercepted messages are processed by the device detection client application, on an outgoing basis during operation of the second computer to detect the media based on events indicating a media change including addition or removal of the removable media from the second computer, wherein the drive detector operates periodically to detect the existing drives in the second computer without processing the intercepted messages, whereby the drive detector is configured to detect ones of the removable media undetectable by the message interceptor;
wherein the intercepted messages are generated by one or more messaging mechanisms in an operating system environment of the second computer and wherein the message interceptor comprises a sub-classed function of a program running in the operating system environment.

2. The system of claim 1, wherein the media change events are defined by a set of changes to be monitored by the device detection client application and wherein the set of changes is generated by the device detection server application and wherein the set of changes include removal of one of the removable media devices from the second computer.

3. The system of claim 1, wherein the message is transmitted automatically upon detection of one of the media changes based on one of the intercepted messages.

4. The system of claim 1, wherein the transmitted message includes a list of devices including the media detected using the message interceptor and the existing drives detected by the drive detector.

5. The system of claim 1, wherein the drive detector monitors drives defined by a list of drive types for monitoring to detect the existing drives in the second computer and wherein the list of drive types is generated by the device detection server application and transmitted to the device detection client application.

6. The system of claim 1, wherein the device detection client application provides to the device detection server application a user name identifying a user of the second computer based on login information at the second computer and a computer identifier identifying the second computer and wherein the device detection server application processes the message from the device detection client application based on the user name to determine whether the detected presence of the removable media on the second computer is an authorized use of the second computer and, if determined not authorized, to generate an alert.

7. The system of claim 1, wherein the device detection server application generates a graphical user interface on the first computer including the transmitted message received from the device detection client application and generates an alert after the transmitted message is received at the second computer, wherein the alert indicates violation of a removable media policy through the use of the detected removable media with the second computer.

8. A method for monitoring use of removable data storage media comprising a physical device adapted to be attached and removed from an externally-accessible drive or port of a computer, comprising: opening communications over a network between a client application on a first computer and a server application on second computer;
with the client application, transmitting a name of the first computer and login information for a user of the first computer to the server application; determining a set of drives on the first computer with the client application; generating a device list for the first computer that includes the determined set of drives;
transmitting the device list to the sewer application; monitoring for changes in the removable data storage media in the first computer by intercepting with the client application messages generated by programs running on the first computer;
when one of the messages relates to one of the changes in the removable data storage media, updating the device list for the first computer based on the messages relating to the changes;
transmitting a message defining a change in the removable data storage media for the first computer based on the one of the messages to the server application; and
with the server application, determining if the change in the removable data storage media is a permitted use of the first computer, wherein the permitted use includes removal or removal of removable media from the first computer;
wherein the server application detects the removable media using both a message interceptor intercepting messages in the second computer and a drive detector detecting existing drives in the second computer;
wherein the intercepted messages are generated by one or more messaging mechanisms in an operating system environment of the second computer and wherein the message interceptor comprises a sub-classed function of a program running in the operating system environment.

9. The method of claim 8, wherein the determining if the change in media is a permitted use is performed based on the login information for the user, whereby differing users of the first computer may have differing permitted uses of removable media.

10. The method of claim 8, further comprising operating the server application to receive the message defining the change in media and in response, generating an alert indicating the change in media on the first computer.

11. The method of claim 8, further comprising determining that a monitoring frequency period has expired since performing the determining of the set of drives and in response, repeating the determining of the set of drives and updating the device list to show any existing drives found on the first computer not shown on the device list.

12. The method of claim 11, further wherein the determining of the set of drives is performed to determine if any drives of a type found in a drive type list are existing on the first computer and wherein the drive type list is transmitted from the server application to the client application.

13. A device detection system, comprising: periodically determining a subset of existing drives on a computer, wherein the subset of existing drives comprises drives on the computer configured for use with removable media; detecting a status change for removable media in the computer; updating a list of devices for the computer to include a most recent one of the subset of the existing drives and each of the detected status changes; transferring the list of devices to an administrator computer linked to the computer by a network; and transferring a message to the administrator computer in response to each of the detected status changes,
wherein the computer comprises a message pump generating messages in response to OS-detected events associated with the status changes in the removable media and wherein the detecting means comprises intercepting the generated messages from the message pump;
wherein the intercepted messages are generated by one or more messaging mechanisms in an operating system environment of the computer and wherein the message interceptor comprises a sub-classed function of a program running in the operating system environment.

14. The system of claim 13, further comprising means on the administrator computer for generating a graphical user interface and means for displaying the message transferred to the administrator computer in the graphical user interface and displaying the transferred list of devices.

15. The system of claim 13, further comprising means on the administrator computer for generating an alert in response to the message transferred to the administrator computer when a media corresponding the message transferred to the administrator is determined to not be on a list of permitted devices for use on the first computer or for use by a user of the first computer.

16. The system of claim 13, further comprising means for transmitting to the administrator computer identification information for the first computer and user information for the first computer.

17. The system of claim 1, wherein the removable media is one of a USB flash drive, a memory key, a ZIP disk, a floppy disk, a CD/DVD, a digital camera, or a plug-in-play device.

18. A method for monitoring authorized use of media in a computer, comprising: opening communications over a network between a client application on a first computer and a server application on a second computer;

with the client application, intercepting event messages generated by at least one message generator running on the first computer;
with the client application, detecting addition or removal of a removable device in the first computer by processing the intercepted event messages; based on the detecting, transmitting a message defining a change in the removable media for the first computer to the server application on the second computer;
with the server application, classifying the defined change as a permitted use of the first computer or an unauthorized use of the first computer; and when the defined change is determined to be an unauthorized use, generating an alert indicting the defined change on the first computer;
wherein the intercepted messages are generated by one or more messaging mechanisms in an operating system environment of the second computer and wherein the message interceptor comprises a sub-classed function of a program running in the operating system environment.

19. The method of claim 18, wherein the detecting of the addition or removal further comprises first determining the removable device is a monitored type of device defined on a list in memory of the first computer, whereby only the monitored device types are monitored by the event message intercepting.

20. The method of claim 19, wherein the list is associated with a user logged onto the first computer, whereby the user may be assigned permitted devices for use with the first computer.

21. The method of claim 18, further comprising periodically running a drive device detector to detect existing drives in the first computer, reporting the detected existing drives to the server application on the second computer, and, with the server application, determining whether a current state of the detected existing drives complies with a defined authorized use of the first computer.

22. The method of claim 8, wherein the removable data storage media comprises a USB drive.

* * * * *

UNITED STATES PATENT AND TRADEMARK OFFICE
CERTIFICATE OF CORRECTION

| | | |
|---|---|---|
| PATENT NO. | : 8,478,860 B2 | Page 1 of 1 |
| APPLICATION NO. | : 11/686055 | |
| DATED | : July 2, 2013 | |
| INVENTOR(S) | : Rodney B. Roberts and Ronald B. Gardner | |

It is certified that error appears in the above-identified patent and that said Letters Patent is hereby corrected as shown below:

Title Page, Item (75) Inventors:

Please replace the first inventor's name with the following:

--Rodney B. Roberts--

In the Claims:

In Column 22, lines 24-28, Claim 8, please replace the paragraph with the following:

--transmitting the device list to the server application; monitoring for changes in the removable data storage media in the first computer by intercepting with the client application messages generated by programs running on the first computer;--

Signed and Sealed this
Twentieth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO.         : 8,478,860 B2                                    Page 1 of 1
APPLICATION NO.    : 11/686055
DATED              : July 2, 2013
INVENTOR(S)        : Rodney B. Roberts et al.

It is certified that error appears in the above-identified patent and that said Letters Patent is hereby corrected as shown below:

In the Claims

In Column 21, please replace the paragraph starting with lines 24-34 of claim 1 with the following:

--wherein the intercepted messages are processed by the device detection client application, on an ongoing basis during operation of the second computer to detect the media based on events indicating a media change including addition or removal of the removable media from the second computer, wherein the drive detector operates periodically to detect the existing drives in the second computer without processing the intercepted messages, whereby the drive detector is configured to detect ones of the removable media undetectable by the message interceptor;--

In Column 22, please replace the paragraph starting with lines 45-49 of claim 8 with the following:

--wherein the intercepted messages are generated by one or more messaging mechanisms in an operating system environment of the first computer and wherein the message interceptor comprises a sub-classed function of a program running in the operating system environment.--

In Column 24, please replace the paragraph starting with lines 20-24 of claim 18 with the following:

--wherein the intercepted messages are generated by one or more messaging mechanisms in an operating system environment of the first computer and wherein the message interceptor comprises a sub-classed function of a program running in the operating system environment.--

Signed and Sealed this
Seventeenth Day of February, 2015

Michelle K. Lee
*Deputy Director of the United States Patent and Trademark Office*